March 29, 1966     E. WINIGER     3,243,581
CHARGING APPARATUS
Filed Oct. 1, 1962
FIG. 1
FIG. 2
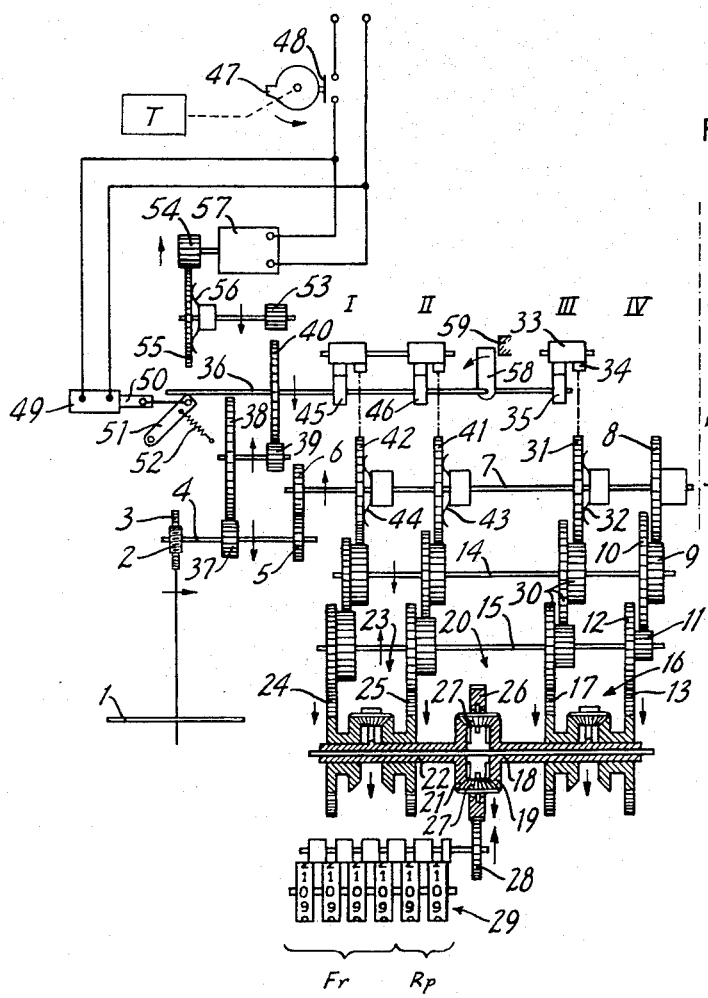
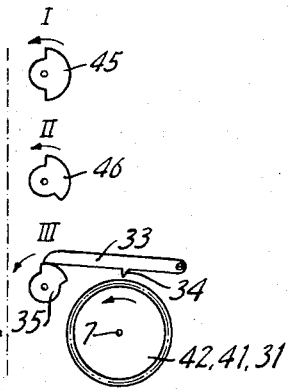
INVENTOR
EDGAR WINIGER
BY Morgan, Finnegan, Durham & Pine
ATTORNEYS

United States Patent Office 3,243,581
Patented Mar. 29, 1966

3,243,581
CHARGING APPARATUS
Edgar Winiger, Cham, Zug, Switzerland, assignor to Landis & Gyr, A.G., Zug, Switzerland, a corporation of Switzerland
Filed Oct. 1, 1962, Ser. No. 227,347
7 Claims. (Cl. 235—92)

This invention relates to apparatus for metering and invoicing the consumption of gas, electricity, water and like media.

In order to relate pricing to costs, the amount of electricity, gas, water or other consumption media withdrawn by a consumer from a supply network is often charged for on a so-called block tariff. In its basic form such a block tariff has one or more fixed limits for consumption in a given period, the measuring period, and when this limit is exceeded the amount consumed in excess of it is charged for at a different unit-price, usually lower than was the amount applicable below the limit. In other words, the consumption within the measuring period is divided into two or more successive consumption blocks, within which different tariffs are charged. In this way the consumer who has used a large amount during the measuring period is generally charged at a more favorable rate than one who has consumed only a small amount.

In further explanation an example is given below of a block tariff for electricity, the tariff having four blocks and a measuring period of one month. According to this tariff, the fractional amounts of the total electricity used during the measuring period falling into the individual blocks are charged for as follows:

| | Cents/kwh. |
|---|---|
| Block I: the first 10 kwh. | at 25 |
| Block II: the next 40 kwh. | at 18 |
| Block III: a further 100 kwh. | at 11 |
| Block IV: all additional kwh. | at 8 |

If the amount invoiced at the end of each measuring period is based on the reading of a meter connected on the input side of the consumer's installation and the counter, as usual, shows only the total amount consumed as such, e.g. in kwh. or cubic meters, then great inconvenience is caused by the fact that the price payable is not proportional to the amount shown on the counter but has to be calculated in separate sections on the basis of the block tariff. For the employees of the supply company the difficulty of meter-reading is generally lessened by use of a table on which the amounts consumed are shown side by side with the respective prices. However, it is only in cases where all the consumers are charged on one and the same block tariff that the use of such a table is not over-laborious. The consumer himself nevertheless experiences considerable difficulty if he wants to find out from the meter reading how much he currently owes the supply undertaking.

Among the objects of the present invention is to provide apparatus for invoicing the amount of electricity, gas, water, etc. consumed on a block tariff, in which the foregoing difficulties are eliminated.

These and other objects and advantages of the invention will be set forth in part hereinafter, and in part will be obvious herefrom, or may be learned by practice with the invention, the same being realized and attained by means of the combinations and instrumentalities pointed out in the appended claims.

The invention consists in the novel parts, constructions, arrangements, combinations and improvements herein shown and described.

An example of the present invention is illustrated in the accompanying drawing. It is assumed in this example that electricity is being invoiced on the basis of a four-block tariff with the price per kilowatt-hour decreasing from block to block.

In the drawings:
FIG. 1 is a diagram in part schematic of a charging apparatus according to the invention, and
FIG. 2 is a side elevation of a check lever device shown in FIG. 1.

In FIG. 1 there is illustrated a rotor disc 1 of an electric meter (not otherwise shown). The disc 1, acting through a worm 2 and a worm-wheel 3, drives a shaft 4 and, through a pair of gearwheels 5, 6, drives a shaft 7, the angle of rotation of the shaft 7 thus being proportional to the electricity consumed as measured by the meter. On the shaft 7 is fixed a gearwheel 8, which transmits the rotation of the shaft 7 through connected gearwheels 9 and 10 and connected gearwheels 11 and 12 to a gearwheel 13. The gearwheels 9 and 10 are mounted for rotation on a shaft 14 and the gearwheels 11 and 12 are similarly mounted on a shaft 15.

The gearwheel 13 is fixed to the right-hand sun wheel of a differential gear 16, and a gearwheel 17 to its left-hand sun wheel. Secured to the associated planet wheel shaft 18 is the right-hand sun wheel 19 of another differential gear 20, of which the left-hand sun wheel 21 is secured to the planet wheel shaft 22 of a third differential gear 23. The sun wheels of the differential gear 23 are fixed to gear-wheels 24 and 25 respectively. As the rotary speed of the planet wheel shaft of a differential gear is equal to half the sum of the speeds of its sun wheels, the speed of the toothed cage 26, on which the planet wheels 27 of the central differential gear 20 are mounted for rotation, is proportional to the sum of the speeds of the gearwheels 13, 17, 24, 25 or—more accurately—is equal to a quarter of this sum.

The toothed cage 26 of the central differential gear 20 is in engagement with a gearwheel 28 on the driving shaft of a drum counter 29. If the gearwheels 24, 25 and 17 are thought of as being stationary while the disc 1 is rotating, then only the rotation of the gearwheel 13 will be transmitted to the counter 29. Since, as described above, the gearwheel 13 constantly rotates with the disc 1, the reading on the counter 29 in this case varies in proportion to the electrical consumption measured by the meter.

The total reduction between the disc 1 and the driving shaft of the counter 29 over the reduction path passing through the gearwheel 13 should be chosen so that the counter reading is equal to the price per kilowatt-hour for Block IV of a four-part block tariff multiplied by the number of kwh. measured by the meter, represented by a corresponding number of revolutions of the disc 1. Thus, in the tariff example given above, if the wheels 17, 24, 25 were stationary, the counter 29 would show the price for the electricity consumed based on a unit price of 8 cents per kwh. So under the conditions hitherto laid down, the counter 29 shows the correct increase in the total invoice amount as consumption increases, provided that all the electricity withdrawn since the beginning of the measuring period is already above the lower limit of Block IV, i.e. in the example given, that it is over 150 kwh.

If, however, the total electricity consumed since the beginning of the measuring period is still below Block IV, in Block III say, i.e., between 50 and 150 kwh. in the present example, then in view of the higher cost per kwh., for a given angle of rotation of the rotor disc 1 the angle of rotation of the meter shaft must be greater than if all the consumption were to be charged at the Block IV rate. In order to achieve this, an additional rotary movement is transmitted to the counter 29, corresponding to the difference between the prices per kwh. in Block III and Block IV. In the numerical example this difference is 11−8=3 cents/kwh., if the whole amount is consumed not in Block IV but only in Block III, so in addition to the rotary movement transmitted to the counter through the gearwheel 13, for a given rotary speed of the disc 1, a further rotary movement must be transmitted to the counter 29, corresponding to the increase in the energy consumed multiplied by the price difference of 3 cents.

The additional rotation is conveyed to the counter 29 through the gearwheel 17, of which the angle of rotation is added to that of the gearwheel 13 in the differential gear 16. The gearwheel 17 is driven through intermediate gearwheels 30, which are mounted for rotation on the shafts 14 and 15, by a gearwheel 31, which is coupled through a slipping clutch 32 with the shaft 7, which is constantly driven by the disc 1.

So long as consumption is within Block III, the gearwheel 31, which is carried along by the shaft 7 through the slipping clutch 32, rotates at exactly the same speed as the gearwheel 8 fixed to the shaft 7. By using suitable intermediate wheels, the speed reductions between the shaft 7 and the wheels 17 and 13 respectively are chosen so that the speed of the wheel 17 and that of the wheel 13, turning in the same direction, are in the same ratio as the difference between the prices per kwh. in Blocks III and IV and the price per kwh. in Block IV.

As soon as consumption exceeds the boundary between Blocks III and IV the gearwheel 17, which is associated with Block III, has to be stopped. This is done by releasing a check lever 33, also shown in FIG. 2, so that its locking lug 34 drops into the gearwheel 31 and locks both this wheel and the gearwheels connected thereto. However, the slipping clutch 32 enables the shaft 7 to continue rotating.

The release of the check lever 33 is controlled—as shown in FIG. 2—by a cam 35. The cam turns in the direction of the arrow and the check lever 33 drops over the rear stop of the cam as soon as consumption exceeds the upper boundary of Block III. The cam 35 is secured to a camshaft 36, which is driven through gearwheels 37 to 40 by the shaft 4, the shaft 4 in turn being coupled to the disc 1 through the worm gear 2, 3.

Just as the gearwheels 31 and 17, which are coupled together by intermediate wheels, are associated with consumption Block III, so the wheels 41 and 25 are in a similar way associated with Block II and wheels 42 and 24 with Block I. The gearwheels 41 and 42 are also coupled to the shaft 7 through friction clutches 43 and 44 respectively. Rotary movements of the wheels 24 and 25 are added in the differential gear 23; the sum of them is led through the planet wheel shaft 22 to the differential gear 20 and, at its toothed cage 26, which drives the counter 29, this sum appears, added to the sum of the rotary movements of wheels 17 and 13. The reduction ratios of the gears located on the one hand between gearwheels 42 and 24, and on the other hand between gearwheels 41 and 25 are dimensioned on the same principles as that described above for the reduction between wheels 31 and 17. That is to say, so long as it is not locked, each of the wheels 24 and 25 rotates similarly to the wheel 17, at a speed which bears the same ratio to the speed of the wheel 13 as the difference between the prices per kwh. of the block associated with the wheel in question and of the next block in the sequence is to the price per kwh. of Block IV, which is next in succession to Block III.

Like the gearwheel 31 associated with Block III, gearwheels 42 and 41, associated with Blocks I and II respectively are each provided with a check lever 33 which is released for locking, by an associated cam 45 and 46 respectively on the camshaft 36, as soon as the measured consumption crosses the boundaries between Blocks I and II or Blocks II and III.

At the beginning of each measuring period the camshaft 36 is moved—in a manner described below—into its starting position, where all three check levers 33 are raised, so that initially all three gearwheels 42, 41 and 31 participate in the rotation of the shaft 7 and transmit their rotations with the appropriate reduction ratios to the wheels 24, 25 and 17. Their rotations are added to that of the wheel 13 by the differential gears 23, 20 and 16, and transmitted to the counter 29. The angles of rotation of all four wheels 24, 25, 17, 13 are proportional to the angle of rotation of the disc 1 and thus to the consumption measured, but their proportionality factors are different. Whereas the proportionality factor for wheel 13 corresponds to the unit price of Block IV, that for wheel 17 corresponds to the difference in unit price of Blocks III and IV. The proportionality factor for wheel 25 corresponds to the difference in unit price between blocks II and III and that for wheel 24 corresponds to the difference in unit price between Blocks I and II. By adding these three unit price differences to the unit price of Block IV one obtains the unit price for Block I. The reading on the counter 29 thus alters in proportion to the amount consumed multiplied by the unit price for Block I.

If after the beginning of the measuring period the consumption measured exceeds Block I, wheel 42 and therewith wheel 24 are locked. The amount by which the price per kwh. of Block I differs from that of Block II thus no longer influences the counter reading, and from then on the counter 29 charges for further consumption at the unit price of Block II until, when Block II is exceeded, the wheel 25 is also stopped and the counter reading is now based on the unit price of Block III. When the wheel 17 is also blocked, further charging is finally based on the unit price of Block IV.

When the measuring period has expired, a time-measuring mechanism T such as a synchronous motor temporarily closes the contact 48 by means of a cam 47. This energizes an electromagnet 49 causing attraction of its armature 50 and the pivoting of a change lever 51 against the action of a return spring 52, thus disengaging the wheels 39 and 40. As a result the camshaft 36 is disconnected from the disc 1. At the same time, however, wheel 40 is brought into engagement with a pinion 53 which is driven, through a toothed-wheel gear 54, 55 and a slipping clutch 56, by a return motor 57 which is also connected through the contact 48, in such a way that the camshaft 36 is again returned to the starting position defined by abutments 58, 59. When the contact 48 reopens, the spring 52 draws back the change lever 51, and the wheel 40 parts from the pinion 53 and re-engages the pinion 59. The apparatus is thus ready for the new measuring period.

As the counter 29 acts cumulatively, it is unnecessary for it also to be returned to zero at the end of the measuring period. However, if it is considered important to be able to determine the price run up during a measuring period even after the end of the period, then two counters can be provided, these being connected alternately in successive measuring periods. The position reached by the connected counter at the end of a measuring period is then retained until the end of the following period, when the counter is re-connected.

The apparatus according to the invention may be modified in many ways from the example described without departing from the idea of the invention. For example, in order to prevent the mechanical loading of the meter caused by the slipping clutches 44, 43 and 32, these can be replaced by disengaging clutches which break the connection leading from the shaft 7 to the appropriate wheel of the group 24, 25, 17, 13 when the associated block tariff group is exceeded.

One can also deviate from the calculating method on which the example is based, viz. forming the unit price of a block by adding unit-price differences to the lowest existing unit price, for example by starting not from the lowest but from the highest unit price and replacing the addition of price differences by subtraction. And, finally, the differential gears for forming sums or differences may be dispensed with altogether if the counter is connected to the motor by the engagement and disengagement of clutches or by change-over means, through a gear with a reduction ratio corresponding to the unit price of the block to which the amount consumed is located at the time.

The invention is thus not limited to the specific mechanisms shown and described, but departures may be made therefrom within the scope of the accompanying claims without sacrificing the principles and advantages thereof.

What is claimed is:

1. The combination with a meter for measuring the consumption of a media delivered by a supply network to a consumer installation and having an output member movable according to said consumption, of means for computing and displaying data related to the cost of said consumed medium based on a multiple tariff having rates varying according to the degree of consumption comprising indicating means for indicating said data, transmission means interconnecting said movable member of said meter and said indicating means and including a plurality of selectively operable transmitting members and automatic change-over means connected to be responsive to the degree of movement of said member for automatically varying the actuation of said transmitting member of said transmission means whereby the response of said indicating means is varied as a function of consumption to reflect changes in said rates.

2. Apparatus according to claim 1 in which said automatic change-over means comprise connecting means responsive to the degree of movement of said movable member and differential gear mechanism having an output member connected to said indicating means, a first input member connected to one of said transmitting members and responsive to said movable member for energizing said indicating means according to a first of said rates and second and third input members connected respectively to other of said transmitting members and adapted to respond to said movable member, said second and third input members being connected to be respectively activated by said connecting means during the period when said degree of movement corresponds with a successively higher second and third rates for respectively increasing the energization of said indicating means when said higher rates prevail.

3. Apparatus according to claim 2 including respective friction clutched gear mechanisms interconnecting said second and third input members with said movable member and in which said connecting means comprise means for selectively locking said gear mechanisms when the degree of movement of said movable member reaches a magnitude corresponding with the upper limit of the respective rate.

4. Apparatus according to claim 3, in which said locking means comprise levers each having a locking extension adapted to engage in the respective gear mechanism, and respective cams for controlling said levers and driven by said movable member via a gear mechanism such that as consumption increases, the levers are each successively moved into the locking position when the upper limit of the consumption corresponding with the respective rate is exceeded.

5. Apparatus according to claim 4, in which the reduction ratio of said cam gear mechanism has a value such that the maximum consumption which can be expected within a measuring period corresponds to an angle of rotation of the cam shaft which is less than that necessary for any one of the cams to contact its associated locking lever and move it from the locking position.

6. Apparatus according to claim 4 including turning means and reset means connected thereto for periodically disconnecting said camshaft from said movable member and returning said camshaft to its starting position.

7. Apparatus as claimed in claim 1 in which said indicating means are calibrated in monetary values.

References Cited by the Examiner

UNITED STATES PATENTS

| | | | |
|---|---|---|---|
| 1,084,684 | 1/1914 | Williams | 235—92 |
| 2,911,144 | 11/1959 | Lee et al. | 235—92 |
| 3,075,698 | 1/1963 | Fletcher | 235—92 |
| 3,164,677 | 1/1965 | Morris et al. | 235—92 |

DARYL W. COOK, *Acting Primary Examiner.*

MALCOLM A. MORRISON, *Examiner.*

J. F. MILLER, *Assistant Examiner.*